United States Patent
Johnson

(10) Patent No.: US 6,811,068 B2
(45) Date of Patent: Nov. 2, 2004

(54) STORAGE CADDY

(76) Inventor: Randall W. Johnson, 6445 Mullan Rd. #A, Missoula, MT (US) 59808

( * ) Notice: Subject to any disclaimer, the term of this patent is extended or adjusted under 35 U.S.C. 154(b) by 65 days.

(21) Appl. No.: 10/245,975

(22) Filed: Sep. 16, 2002

(65) Prior Publication Data

US 2004/0050890 A1 Mar. 18, 2004

(51) Int. Cl.$^7$ .............................. B60R 9/06; B60R 9/08
(52) U.S. Cl. ...................... 224/404; 224/281; 224/282; 296/37.5; 296/37.6; 312/323; 312/330.1; 414/462
(58) Field of Search ................................ 224/281, 282, 224/404, 539, 542; 312/322, 323, 330.1; 229/913; 220/558; 206/478; 414/462; 296/37.1, 37.5, 37.6

(56) References Cited

U.S. PATENT DOCUMENTS

| | | | | |
|---|---|---|---|---|
| 498,283 A | * | 5/1893 | Miller | 206/478 |
| 1,927,922 A | * | 9/1933 | Crum | 296/37.1 |
| 2,450,337 A | * | 9/1948 | Hearst | 312/330.1 |
| 3,113,819 A | * | 12/1963 | Bessette | 224/328 |
| 4,285,557 A | * | 8/1981 | Paladino et al. | 224/282 |
| 4,399,913 A | * | 8/1983 | Gelardi et al. | 312/322 |
| 4,573,731 A | * | 3/1986 | Knaack et al. | 296/37.6 |
| 4,596,347 A | * | 6/1986 | Hite | 224/282 |
| 4,733,898 A | * | 3/1988 | Williams | 224/542 |
| 4,915,437 A | | 4/1990 | Cherry | |
| 5,058,765 A | * | 10/1991 | Gomi et al. | 220/528 |
| 5,201,575 A | * | 4/1993 | Stolzel | 312/323 |
| 5,213,364 A | | 5/1993 | Theckston | |
| 5,788,070 A | | 8/1998 | Banker | |
| 5,848,694 A | | 12/1998 | Newton | |
| 5,848,818 A | * | 12/1998 | Flueckinger | 296/37.6 |
| 5,897,154 A | | 4/1999 | Albertini et al. | |
| 6,006,971 A | | 12/1999 | Coleman et al. | |
| 6,183,029 B1 | | 2/2001 | Deaton | |
| 6,253,976 B1 | | 7/2001 | Coleman et al. | |
| 6,276,583 B1 | | 8/2001 | Tourneur | |

* cited by examiner

Primary Examiner—Gary E. Elkins
(74) Attorney, Agent, or Firm—Saliwanchik, Lloyd & Saliwanchik

(57) ABSTRACT

A storage caddy has a slidable drawer on which items are stored. Items are presented for removal when the drawer is slid from the shell of the caddy. Items stored in a caddy with a hinged drawer, can be removed by breaking the drawer at the hinge to drop the item toward the ground for convenient and safe removal. A set of golf clubs stored in the caddy in the bed of a pick-up truck are slid from the shell on the drawer. The horizontal plane of the drawer is then broken at the hinge and the bottom of the golf bag moves toward the ground. The golf bag can then be easily lifted onto the shoulder or rolled away. The caddy positions heavy items for easy removal preventing undue stress or injury on those retrieving items from the caddy.

17 Claims, 6 Drawing Sheets

STORAGE CADDY

BACKGROUND OF THE INVENTION

Golf is a sport that can be enjoyed by almost everyone. Carrying and transporting a golf bag loaded with heavy clubs, however, can be burdensome for some golfers. A golf bag with wheels prevents the golfer from having to carry the loaded bag over a shoulder, but the bag still must be lifted from the ground into or out of the trunk of a car, or the back of a vehicle. Placing golf clubs in the bed of a pick-up truck requires that the bag be either hoisted over the sides of the bed or at least lifted to the level of an open tailgate. A golf bag stored in the trunk of a car or the back of a van or sports utility vehicle (SUV) requires one to reach into the vehicle to remove it lifting with the back instead of properly lifting with the legs. A means by which a golf bag, or any heavy object, can be loaded into a vehicle, especially into the bed of a pick-up truck, without having to lift the object from the ground into the vehicle would prevent undue stress on bones, joints and muscles. Further, a means by which a golf bag can be presented to the golfer without the golfer having to reach into the vehicle and lift improperly can reduce back strain. Finally, perhaps such a means could also make accessible a sport or activity that may be restricted to those who are limited physically.

Storage racks and tool trays that fit into the bed of a pick-up have been described (U.S. Pat. Nos. 6,006,971 and 6,253,976 B1). Often these tool racks incorporate drawers that slide out of the bed of the truck (U.S. Pat. Nos. 4,915,437, 5,848,694 and U.S. Pat. No. 5,897,154). These references do not however describe a storage unit for a pick-up that lowers a stored object to the ground for easy removal. Likewise, various golf bag storage devices which have been described for storing golf bags in or on golf carts (U.S. Pat. No. 5,788,070) or in mini-vans or sport utility vehicles (U.S. Pat. No. 6,276,583 B1) require that the bag be lifted out of the storage device.

The need remains for a storage device which presents a stored item to a user and/or lowers the stored item, such as a golf bag, from the vehicle in which it is stored to the ground to prevent one from having to lift the item into and out of the vehicle. Since tools and sporting equipment, especially golf clubs, are expensive, it would be an added advantage if this storage device, or caddy, is lockable and secure.

All patents, patent applications, provisional patent applications and publications referred to or cited herein, are incorporated by reference in their entirety to the extent they are not inconsistent with the explicit teachings of the specification.

SUMMARY OF THE INVENTION

The subject invention involves a storage caddy with a slidable drawer that positions items for convenient removal. A hinged drawer in the caddy allows an item to be lowered to the ground for easy, safe removal. The storage caddy of the subject invention has an outer shell which slidably receives the tray or drawer. A preferred embodiment of the caddy is used for securing and storing golf bags in the bed of a pick-up truck. A golf bag laid on a hinged drawer can be secured within the lockable shell which is bolted to the truck bed. To remove the golf bag from the storage caddy, the drawer is slid from the shell, presenting the bag to the golfer. To further facilitate removal of the bag from the truck, the drawer can be broken at the hinge. The end of the bag on the broken drawer moves toward the ground, thus it is not necessary to awkwardly lift the bag from the bed of the pick-up. The caddy of the subject invention is useful for those with limited mobility and can prevent muscle strain or joint injury. Further, the shell and the drawer of the storage caddy of the subject invention can be lockably engaged to provide a secure storage area.

DETAILED DESCRIPTION OF THE INVENTION

Figure 1:
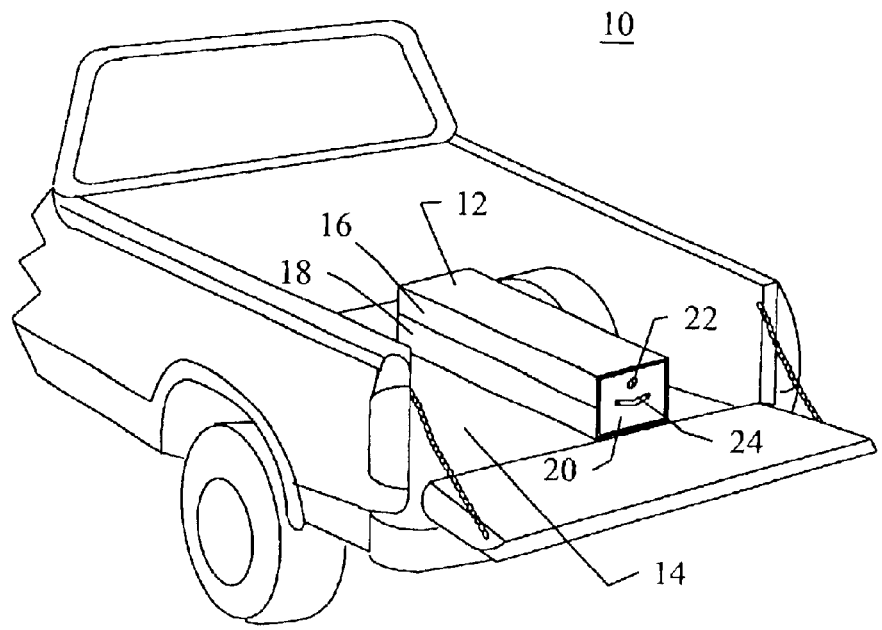
FIG. 1 shows a preferred embodiment of the slidable storage caddy of the subject invention mounted on a pick-up truck bed.
Figure 7:
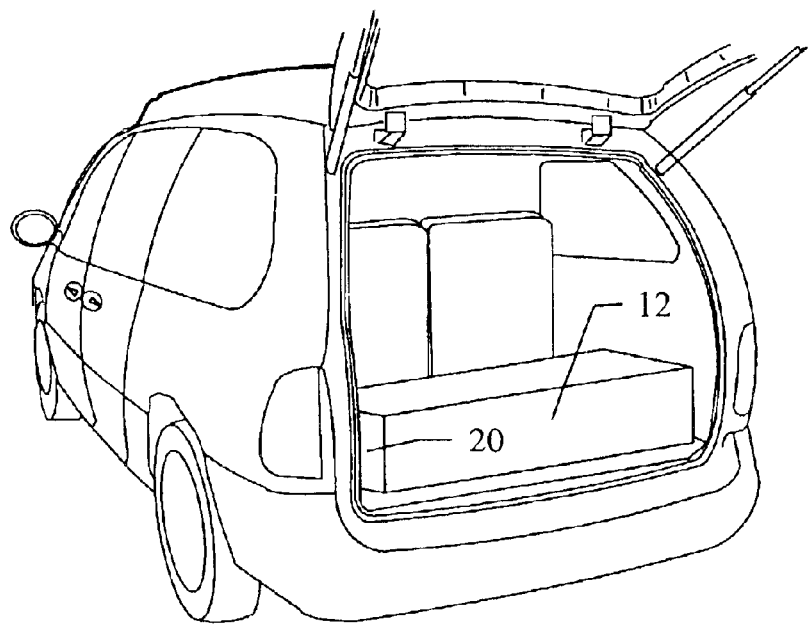
FIG. 7 shows another preferred embodiment of the storage caddy of the subject invention stowed and mounted in a minivan.
Figure 8:
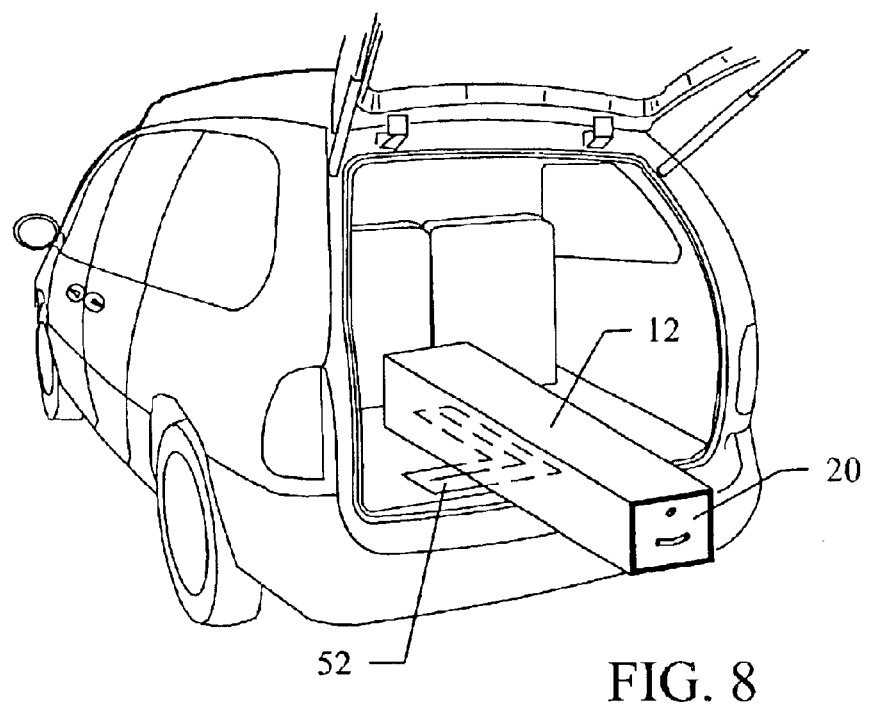
FIG. 8 shows the embodiment of the storage caddy in FIG. 7 swivelled to make the drawer front accessible.
Figure 9:
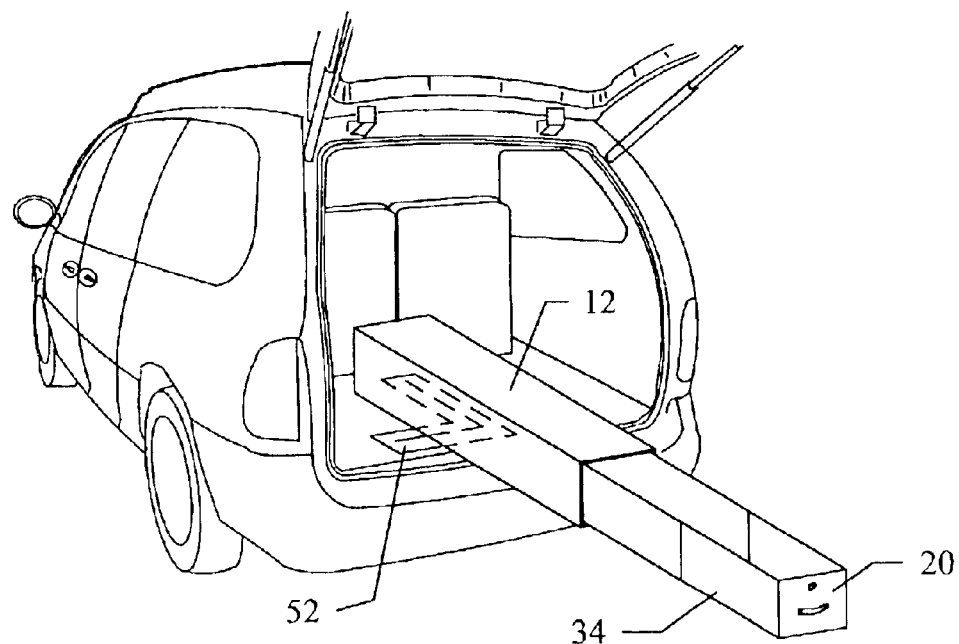
FIG. 9 shows the embodiment of the storage caddy in FIG. 8 with the slidable drawer extended.
Figure 10:
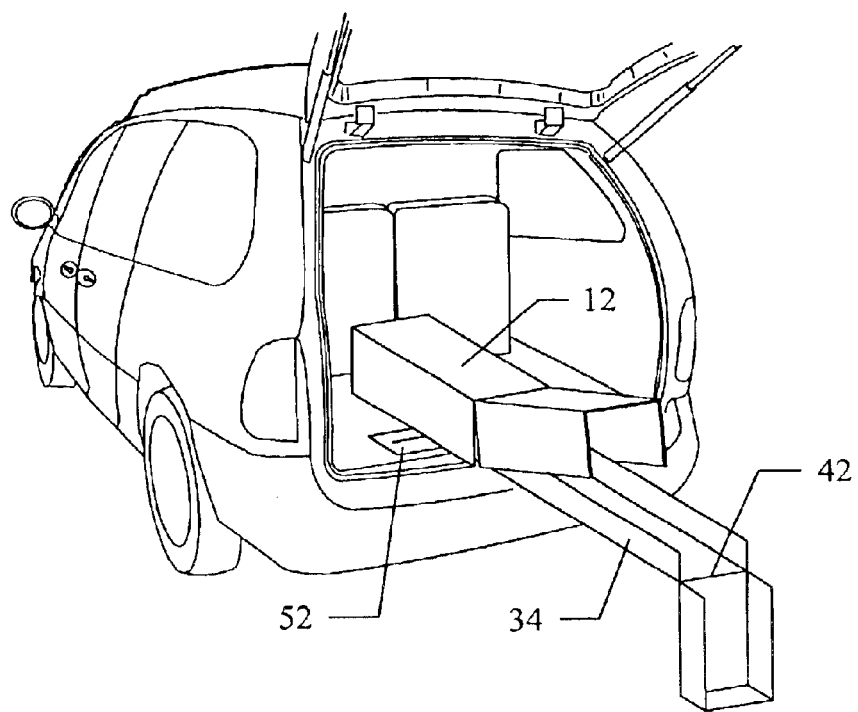
FIG. 10 shows the embodiment of the storage caddy in FIG. 9 with the slidable drawer extended and in the broken position.

The subject invention involves a universal storage caddy which presents the stored items to a user for safe and convenient removal. A preferred embodiment of the storage caddy of the subject invention is shown generally at 10 in FIG. 1. In this embodiment, the caddy is shown mounted to the bed of a pick-up truck. Other embodiments, for example the embodiments shown in FIG. 7 and FIG. 11, can be configured to be used in or on other vehicles. The present description of any preferred embodiments should therefore not be used to limit the scope of this universal storage caddy.

The storage caddy of the subject invention has an outer shell 12 which slidably receives a drawer. The shell 12 can be made of wood, metal or plastic. A primary object of the subject invention is to provide a secure storage area for sporting equipment. Thus, a shell of metal or a resilient, reinforced plastic is desirable. A metal shell would provide superior theft protection but may be heavy and subject to rust. An aluminum shell, however, is lightweight, durable and resistant to break-ins. A plastic shell is lightweight, durable and resistant to rust.

To further provide a secure storage unit, the shell preferably is affixed to the vehicle in which it is being transported. For example, the shell 12 of the embodiment shown in FIG.

1, is affixed to the bed 14 of a pick-up truck. The shell can be affixed by any appropriate attachment means including bolting, welding or strapping the shell to the vehicle. The shell can be constructed of one or more pieces. In the embodiment shown in FIG. 1, the shell is constructed of two pieces, an upper section 16 and a lower section 18. The lower section 18 of the shell is secured to the truck by bolting it directly to the bed 14. When the shell is affixed in this manner the bolt heads are not accessible from outside the shell and thus are protected from tampering. Other mounting means are likewise applicable to secure the shell to the vehicle carrying it including, but not limited to, flanges integrally formed from the shell or independent of the shell, as well as mounting plates, or modified mounting surfaces. The shell can also be affixed to a vehicle by its side or its top.

The upper section 16 of the shell of a preferred embodiment is releasably attached to the lower section 18. The releasable top 16 facilitates installation of the caddy allowing the lower section 18 to be affixed, for example, to the bed 14 of the truck without interference or confinement by the upper section 16. The upper and lower sections can be adjoined by any means. For example, the upper and lower sections can be bolted to one another through flanges on each piece. It would be apparent that internal flanges are not accessible from the outside of the caddy and provide a secure storage unit. Alternatively, the sections can be configured to slidably connect to one another.

To further provide a secure caddy, the face 20 of the hinged drawer lockably engages the edges of the shell's upper section 16 and lower section 18 to create an enclosed storage unit. A locking system which locks the face 20 to the shell 12 can be any type including, but not limited to, conventional paddle locks 22 and padlocks. A handle 24 allows the user to slide the drawer into and out of the shell. The handle 24 can be part of the locking system.

In the exemplified embodiment; the shell is a rectangular box with the upper section 16, a lid or top, covering the base of the box, or lower section 18. The box or shell has two elongated sides, 26 and 28, a front end 30 and a back end 32. The drawer face 20 serves as the front end 30 of the shell. The drawer slides into and out of the box parallel to sides 26 and 28. The shell however can be any shape which can receive a sliding drawer. For example, the edges of the exemplified box can be rounded so the shell might take on a more cylindrical shape.

Figure 2:
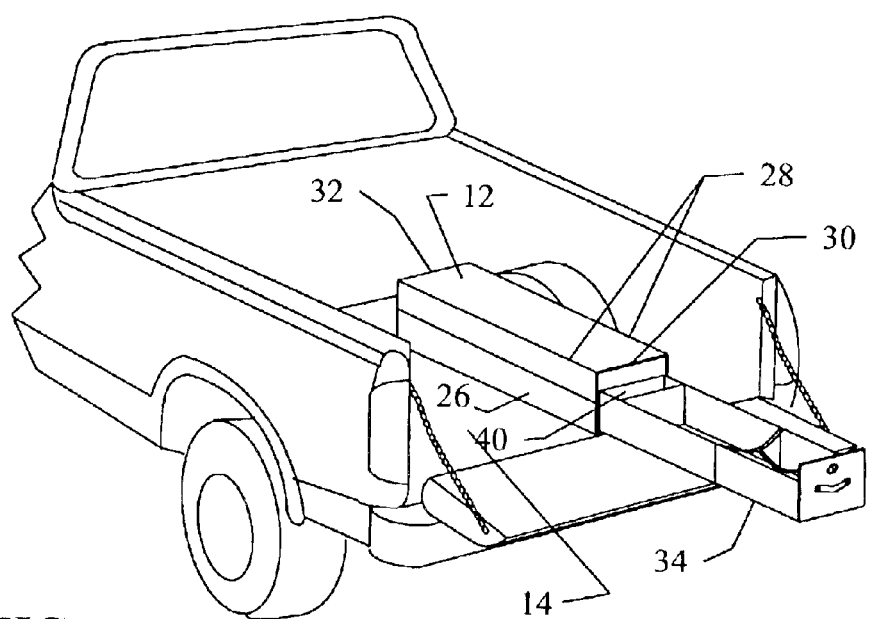
FIG. 2 shows the embodiment of the storage caddy in FIG. 1 with the slidable tray extended.
Figure 3:
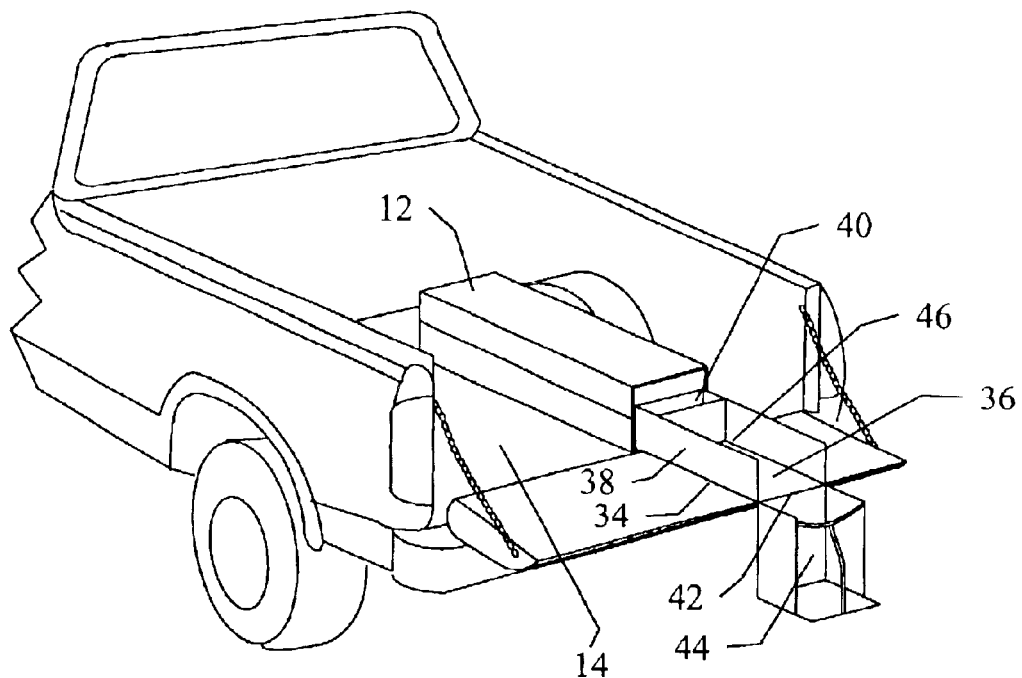
FIG. 3 shows the embodiment of the storage caddy in FIG. 1 with the slidable tray in its broken position.
Figure 4:
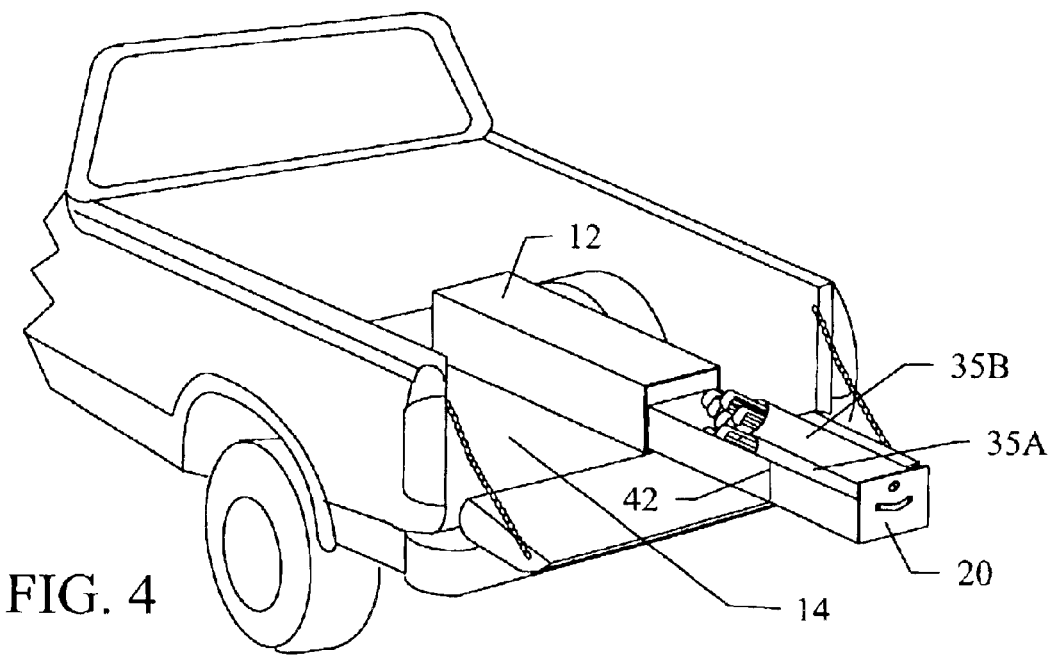
FIG. 4 shows a preferred embodiment of the storage caddy of the subject invention mounted on the bed of a pick-up truck where the storage caddy is loaded with two golf bags and the slidable drawer is extended.
Figure 5:
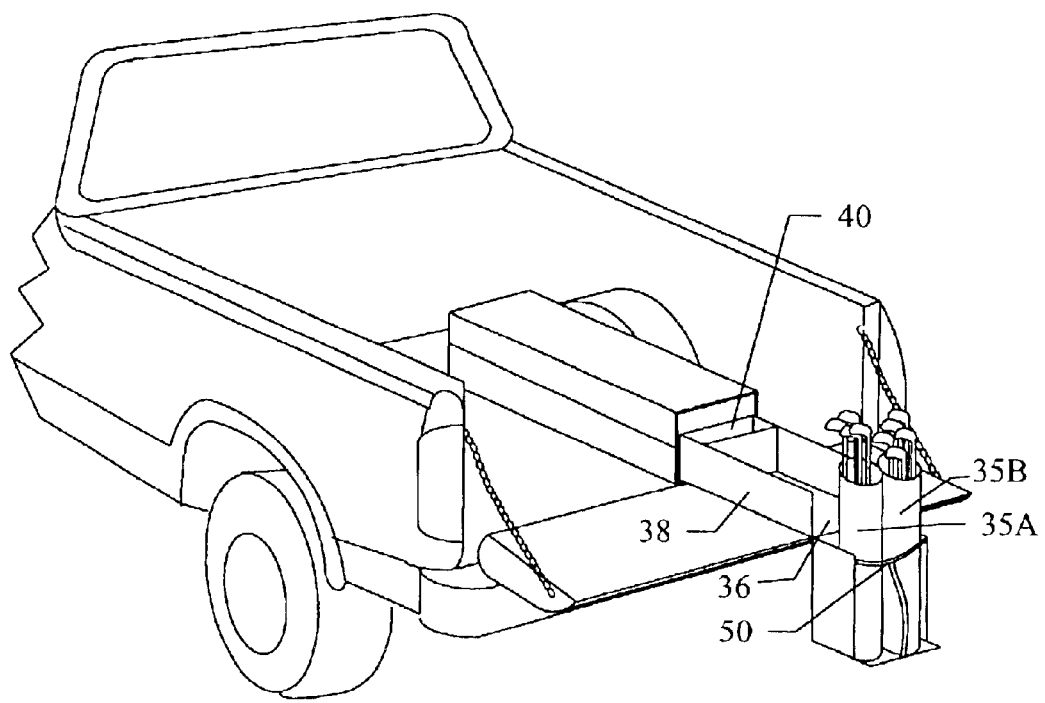
FIG. 5 shows the embodiment of the storage caddy in FIG. 4 with the slidable drawer extended and in the broken position.

The shell 12 slidably receives a drawer 34. The drawer slides freely into and out of the shell. The drawer can slide by friction along the bottom of the shell. Tracks and bearings on the shell and drawer can also be provided to assist in movement of the drawer. The drawer drawn from the shell presents stored items directly to a user. To further facilitate removal of items from the storage caddy, in a particularly preferred embodiment, the drawer 34 is hinged (FIG. 2). When the hinge is broken, the face of the drawer 20 drops away from the shell (FIG. 3). In the exemplified embodiment, the drawer is configured to hold golf bags 35a and 35b (FIG. 4 and FIG. 5). Thus, the drawer 34 has a bottom or tray 36 with sides 38 to support the bags. In a particularly preferred embodiment, a storage area 40 is positioned near the back end of the drawer to store golf balls, tees or shoes. If desired, the storage area 40 can be covered and locked to provide an additional locked compartment for the storage caddy.

The drawer 34 breaks at the hinge 42 into a front section 44 and a rear section 46. The hinge 42 can be any mechanism that allows the drawer sections to move so that they are at right angles to one another. A simple piano hinge allows the front section 44 to move from a position that is horizontal, and collinear, with the drawer rear section 46 to a position that is vertical, and perpendicular, to the rear section. A locking mechanism or latch can be used to lock the hinge 42 keeping both sections of the drawer horizontal.

The drawer of the exemplified embodiment is configured to hold two golf bags. A strap 48 holds the golf bags 35a and 35b onto the drawer 34. The drawer however can be customized and configured to hold a variety of items. While deep sides 38 may not be necessary to store flatter items such as tools, the tray 36 could be fitted with special clamps or adapters to hold the tools. It is important to note, that it is not necessary to reach into the vehicle to retrieve whatever is carried in the storage caddy of the subject invention. The subject caddy presents these items to the user on the drawer. Further, items stored in the subject caddies can be safely lowered to the ground in embodiments with hinged drawers. A gas canister, for example, need not be dangerously lifted from a truck, but the bottom of the canister can be controllably lowered to the ground so it can be moved by a dolly. A strap 50 serves as a handle to raise and lower the front section 44 of the drawer in the embodiment shown in FIGS. 4 and 5.

Figure 6:
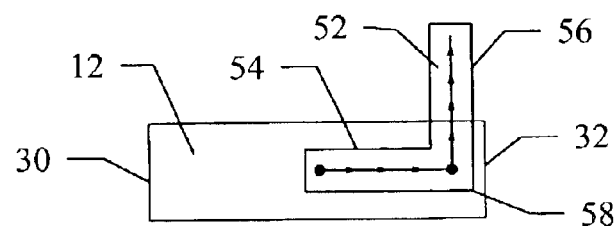
FIG. 6 shows a swivel base for mounting the storage caddy of the subject invention in a minivan or SUV.

Another preferred embodiment of the storage caddy of the subject invention is shown in FIGS. 6–10. This embodiment is configured for use in a sports utility vehicle (SUV) or van. The shell 12 is mounted to the vehicle with a swivel base which allows the shell to be rotated to expose the drawer face 20. It would be readily apparent to one skilled in the art that a number of swivel mechanisms would allow such movement. A preferred swivel base 52, however, is shown in FIG. 6. The subject swivel base comprises a simple L-shaped track. The track has one leg 54, another leg 56 and a bend 58 separating the legs. Pins on the bottom of the shell engage and are guided by the track. The front end 30 of the shell must be pushed toward the rear end 32 along the one leg 54 of the L until the pin reaches the bend 58 of the L. The front end 30 of the shell can then be swivelled to reveal the drawer face 20 as the shell 12 is slid toward the front of the vehicle along the other leg 56 of the L.

Figure 11:
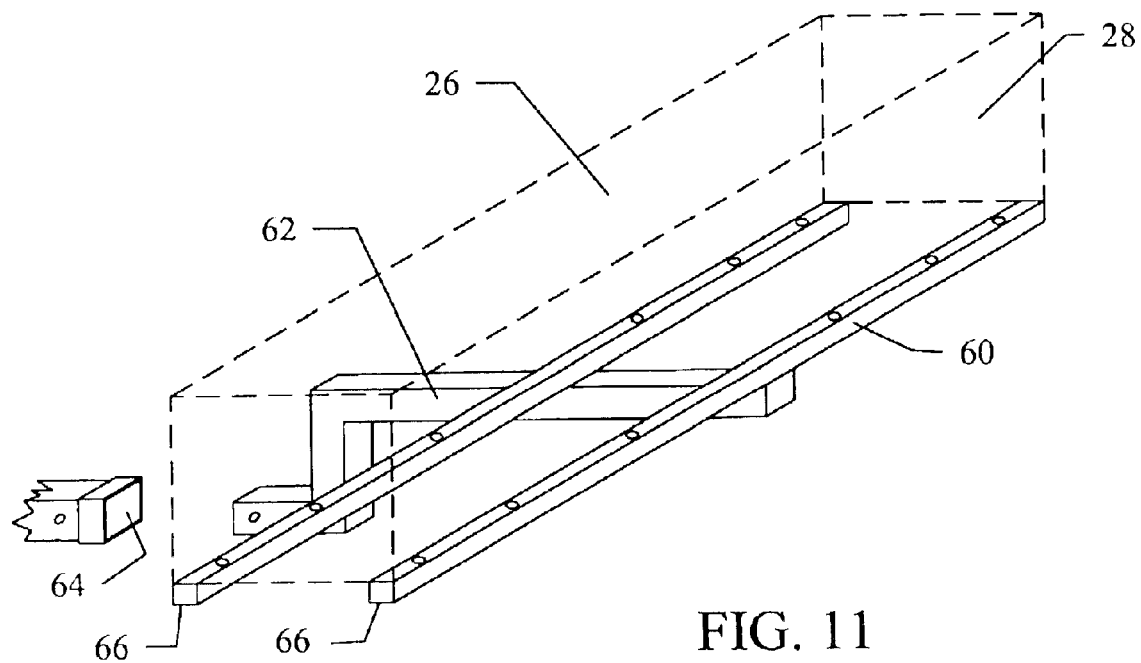
FIG. 11 shows another preferred embodiment of the storage caddy of the subject invention for mounting to the rear of a vehicle using a universal receiving hitch.

Another preferred embodiment of the storage caddy of the subject invention is shown in FIG. 11. This embodiment is configured to be secured to the back of a vehicle which has a universal receiving hitch. A frame 60 is attached to a tongue 62 which is received by the receiving hitch 64 on the vehicle. The frame 60 can be any configuration which adequately supports the shell 12. In the exemplified embodiment, the frame 60 comprises parallel supports 66 under the long sides 26, 28 of the shell. The drawer face 20 of a storage caddy mounted to a vehicle in such a manner is readily accessible and the drawer can slide freely for the removal of stored items.

In use, the drawer 34 is pulled horizontally from the shell 12. The drawer 34 is broken at the hinge 42. An item, such as a golf bag, is placed against the front section 44 of the tray 36, with the bottom of the item resting on the drawer front 20. The front section 44 is then lifted and the hinge 42 is locked so that the front section 44 and rear section 46 are in the same plane. The drawer 34 is slid back into the shell 12. In a preferred embodiment, the drawer front 20 engages and is locked to the shell 12 to provide a secure enclosure. To remove the item from the storage caddy, the drawer is unlocked and slid from the shell 12. The hinge is broken dropping the bottom of the bag to the ground. The golf bag can then be wheeled away or easily hoisted on the shoulder.

It is understood that the foregoing examples are merely illustrative of the present invention. Certain modifications of the articles and/or methods employed may be made and still achieve the objectives of the inventions. Such modifications are contemplated as within the scope of the claimed invention.

What is claimed is:

1. A storage caddy comprising a shell which slidably receives a hinged drawer, and a mounting means for mounting the shell to a vehicle, said hinged drawer being sufficiently removable from said shell to permit an item stored in said caddy on said drawer to be removed from the caddy by sliding said drawer from said shell and breaking said drawer at said hinge wherein said stored item is rotated about said hinge and a portion of said stored item is lowered toward the ground.

2. The storage caddy of claim 1, wherein said shell is rectangular.

3. The storage caddy of claim 1, wherein said shell comprises at least two sections.

4. The storage caddy of claim 3, wherein said shell comprises an upper section and a lower section.

5. The storage caddy of claim 4, wherein said upper section is releasably connected to said lower section.

6. The storage caddy of claim 1, wherein said shell is constructed of materials selected from the group consisting of wood, metal and plastic.

7. The storage caddy of claim 1, wherein said drawer has a drawer face which lockably engages said shell to provide a secure storage unit.

8. The storage caddy of claim 1, wherein said drawer further comprises a storage box.

9. The storage caddy of claim 1, wherein said drawer further comprises sides to hold said stored item on said drawer.

10. The storage caddy of claim 1, wherein said drawer further comprises straps to hold said stored item to said drawer.

11. The storage caddy of claim 1, wherein said drawer further comprises a handle to assist in lowering said broken drawer toward said ground and lifting said broken drawer away from said ground.

12. The storage caddy of claim 1, wherein said mounting means is an L-shaped track.

13. The storage caddy of claim 1, further comprising a frame comprising parallel supports to support said shell and a tongue to be received by the receiving hitch of a vehicle.

14. The storage caddy of claim 13, wherein said mounting means is an L-shaped.

15. A storage caddy comprising a rectangular shell having a top, a bottom, a front end, a back end and two elongated sides and a hinged drawer slidably received by said shell parallel to said two elongated sides, said hinge defining a front section of said drawer and a rear section of said drawer, said front section proximate said front end of said shell when said drawer is received by said shell, said rear section proximate said back end of said shell when said drawer is received by said shell to, said drawer further comprising a face which engages said front end of said shell to provide an enclosed storage unit; and a mounting means to mount said shell to a vehicle;

wherein an item stored on said drawer within said shell is removed from said caddy by sliding said drawer from said shell and breaking said drawer at said hinge, said rear section of said drawer remaining in the same plane of said shell and said front section of said drawer moving away from said shell, wherein a portion of said item supported by said rear section of said drawer moves away from said shell.

16. The storage caddy of claim 15, wherein said mounting means is a frame comprising parallel supports to support said shell anti a tongue to be received by a receiving hitch on vehicle.

17. A golf bag storage caddy for storing at least one golf bag, said caddy comprising:

a shell having a front end and a back end; and a hinged drawer which is slidably received by said shell, said drawer comprising a tray, to support said at least one golf bag, at least one side to hold said at least one golf bag on said fray, at least one strap to hold said at least one golf bag on said tray and a drawer face, which lockably engages said front end of said shell to provide a secure storage unit;

wherein a golf bag stored on said drawer within said shell which is mounted in the bed of a pick-up truck is removed from said caddy by sliding said drawer from said shell and breaking said drawer at said hinge wherein the bottom of said golf bag moves toward the ground.

* * * * *

UNITED STATES PATENT AND TRADEMARK OFFICE
CERTIFICATE OF CORRECTION

PATENT NO.   : 6,811,068 B2
DATED        : November 2, 2004
INVENTOR(S)  : Johnson It is certified that error appears in the above-identified patent and that said Letters Patent is hereby corrected as shown below:

Column 6,
Line 11, delete "to";
Line 27, "anti" should read -- and --; and
Line 36, "fray" should read -- tray --.

Signed and Sealed this

Twenty-second Day of February, 2005

JON W. DUDAS
*Director of the United States Patent and Trademark Office*